US009970661B2

(12) United States Patent
Calvin

(10) Patent No.: US 9,970,661 B2
(45) Date of Patent: May 15, 2018

(54) FOLDING STOVE

(71) Applicant: Standard Brands (UK) Limited, Leatherhead Surrey (GB)

(72) Inventor: Tan Calvin, Glasgow (GB)

(73) Assignee: Standard Brands (UK) Limited, Surrey (GB)

( * ) Notice: Subject to any disclaimer, the term of this patent is extended or adjusted under 35 U.S.C. 154(b) by 0 days. days.

(21) Appl. No.: 14/916,848

(22) PCT Filed: Apr. 17, 2014

(86) PCT No.: PCT/GB2014/051213
§ 371 (c)(1),
(2) Date: Mar. 4, 2016

(87) PCT Pub. No.: WO2015/033097
PCT Pub. Date: Mar. 12, 2015

(65) Prior Publication Data
US 2016/0195276 A1 Jul. 7, 2016

Related U.S. Application Data

(63) Continuation-in-part of application No. 14/020,415, filed on Sep. 6, 2013, now abandoned.

(51) Int. Cl.
*A47J 33/00* (2006.01)
*F24B 1/20* (2006.01)
*C10L 7/02* (2006.01)

(52) U.S. Cl.
CPC ............... *F24B 1/205* (2013.01); *A47J 33/00* (2013.01); *C10L 7/02* (2013.01); *C10L 2200/0259* (2013.01); *C10L 2270/08* (2013.01)

(58) Field of Classification Search
CPC .... F24B 1/205; F24B 1/26; C10L 7/02; C10L 2200/0259; C10L 2270/08; A47J 33/00; A47J 27/002

(Continued)

(56) References Cited

U.S. PATENT DOCUMENTS 3,384,066 A * 5/1968 Tufts .................. A47J 37/079
126/9 R
3,682,154 A 8/1972 Mollere
(Continued)

FOREIGN PATENT DOCUMENTS

EP 2613093 A2 7/2013
GB 191423041 A * 10/1915 ............... B23K 3/08
WO WO-9937955 A1 7/1999

OTHER PUBLICATIONS

International Searching Authoriity, International Search Report for Application No. PCT/GB2014/051213, dated Nov. 27, 2014.
(Continued)

*Primary Examiner* — Avinash Savani
*Assistant Examiner* — Rabeeul Zuberi
(74) *Attorney, Agent, or Firm* — Honigman Miller Schwartz and Cohn LLP; Matthew H. Szalach; Jonathan P. O'Brien

(57) ABSTRACT

This invention relates to portable cooking stoves and in particular, to lightweight, flat-packable stoves that are easily deployed into the cooking arrangement and that have an integrated cooking chamber. The integrated food chamber should be capable of holding sufficient water to be boiled for a drink, or to heat sufficient food to provide for a hot meal for one person. The cooking stoves of the present invention are intended primarily for outdoor leisure pursuits such as backpacking, hiking and camping, as well as serving humanitarian and military dismounted soldier needs.

17 Claims, 9 Drawing Sheets

(58) Field of Classification Search
USPC ............. 126/29, 9 R, 25 R, 30, 9 B, 9 A, 38
See application file for complete search history.

(56) References Cited

U.S. PATENT DOCUMENTS

| | | | | |
|---|---|---|---|---|
| 4,714,013 | A | * | 12/1987 | Telfer ........................ F24C 1/16 |
| | | | | 126/9 R |
| 4,905,659 | A | * | 3/1990 | Armistead ................ F24C 1/16 |
| | | | | 126/25 A |
| 4,938,202 | A | | 7/1990 | Hait |
| 5,303,691 | A | | 4/1994 | Armistead |
| 6,532,951 | B1 | | 3/2003 | Sallie et al. |
| 6,708,604 | B1 | | 3/2004 | Deichler, Jr. |
| 7,107,983 | B1 | | 9/2006 | West |
| 2007/0006863 | A1 | * | 1/2007 | Barbarich ........... A47J 37/0763 |
| | | | | 126/9 R |
| 2008/0230043 | A1 | * | 9/2008 | Bruno ................... A47J 37/079 |
| | | | | 126/25 B |
| 2009/0314285 | A1 | | 12/2009 | Marsh |
| 2011/0023390 | A1 | * | 2/2011 | Kneip ................... F24J 2/4636 |
| | | | | 52/173.3 |
| 2013/0180515 | A1 | * | 7/2013 | Zandbergen ............ A47J 36/26 |
| | | | | 126/25 R |

OTHER PUBLICATIONS

USPTO, Non-Final Office Action for U.S. Appl. No. 14/020,415 dated Jul. 6, 2015.
European Patent Office, Communication pursuant to Article 94(3) EPC for Application No. 14721000.9, dated Apr. 10, 2017.
IKEA, "GRILLA Grill pan—IKEA", IKEA Catalog Product Description, May 30, 2013, XP055361353, Retrieved from internet on Apr. 3, 2017, <http://web.archive.org/web/20130530112700/http://www.ikea.com/us/en/catalog/products/50055085>.

* cited by examiner

FOLDING STOVE

CROSS-REFERENCE TO RELATED APPLICATIONS

This application claims priority under 35. U.S.C. § 371 to Patent Cooperation Treaty Application No. PCT/GB2014/051213, filed Apr. 17, 2014, which claims priority to U.S. application Ser. No. 14/020,415, filed Sep. 6, 2013, the entire contents of which are incorporated herein by reference.

FIELD OF INVENTION

This invention relates to portable cooking stoves and in particular, to lightweight, flat-packable stoves that are easily deployed into the cooking arrangement and that have an integrated cooking chamber. The integrated food chamber should be capable of holding sufficient water to be boiled for a drink, or to heat sufficient food to provide for a hot meal for one person. The cooking stoves of the present invention are intended primarily for outdoor leisure pursuits such as backpacking, hiking and camping, as well as serving humanitarian and military dismounted soldier needs.

BACKGROUND TO THE INVENTION

Outdoor enthusiasts and military personnel that carry their own equipment, often for extended periods of time, need their equipment to be lightweight, suitable for compact storage and easy to set up and use. Most users will also require that the cooking stove is cost-effective. In certain situations, such users would also prefer that the stove is disposable.

In considering the weight of a portable cooking stove, the weight of the cooking vessels and fuel required to heat water or food must also be considered. To limit the weight of the cooking vessel, the user must often purchase cooking vessels made from specialist materials that are heat-resistant and lightweight. This of course provides an additional economic burden to the user. The cooking vessel will also take up further storage space.

Environments that do not offer a source of fuel, such as dried wood, are frequently encountered, requiring the prudent user to also carry their own fuel. To assist with keeping weight down, solid-fuel blocks can be used, such as hexamine blocks, trioxane blocks, solidified methyl decanoate blocks or gelled alcohol packs. These blocks prevent the need for extra containers (as with gas or liquid fuels) or regulation equipment (pressure regulators or valves) and reduce the risk of fuel spillage or other accidental release. Certain solid fuels are waterproof, and further waterproof protection can be provided by means of a thin plastic wrapper.

Lightweight portable cooking stoves that can be dismantled and packed in a flat configuration are known in the prior art. Dismantling entails disassembly of the stove into multiple separate and distinct components. These flat packed stoves therefore often require multiple steps by the user for full assembly. Vessels for heating the water or food are provided separately.

There is a need for portable cooking stoves and heating vessels that are lightweight and compact. There is also a need for a cooking stove that is fast and easy to set up.

SUMMARY OF THE INVENTION

According to a first aspect, the present invention relates to a portable cooking stove that comprises an integrated cooking chamber wherein the portable cooking stove can be folded to provide a flat arrangement and unfolded to provide a deployed arrangement.

The present invention aims to simultaneously solve the problems of conventional stoves and heating vessels by providing a stove and cooking chamber that can be simply unfolded from the flat arrangement to the deployed arrangement. Furthermore, through having an integrated cooking chamber the stove obviates the need for bearing the weight of, and having space taken up by, separate cooking vessels. Additionally, the stove can be provided as an ultra-lightweight disposable stove fabricated from thin-gauge material, or as a more robust stove fabricated from thicker gauge material.

Having an integrated cooking chamber provides for a number of surprising advantages over using a separate cooking vessel, as is conventional. As the integrated cooking chamber is part of the stove, there is no requirement for handles or any other extra support to the cooking vessel that adds weight. The integrated cooking chamber also allows the designer to know the maximum weight of the cooking chamber plus contents. Crucially, this means that the designer does not need to add unnecessary support, and therefore weight, to the walls of the portable cooking stove to ensure that even the heaviest of cooking vessels are supported. Furthermore, the integrated cooking chamber will have a similar usage lifetime to the stove and will, inherently, always have undergone the same number of use cycles and stresses as the stove.

The provision of an integrated cooking chamber removes the requirement that the user must also purchase, find space for, and bear the weight of an additional cooking vessel. Integration also helps prevent situations where the additional cooking vessel can topple off the stove or be accidentally knocked off the stove.

Through conducting extensive research, the inventor has provided a portable cooking stove with an integrated cooking chamber that can transition between a flat arrangement and a deployed arrangement by unfolding only. The approach taken by the inventor in inventing this stove is more aligned to the Japanese art of origami than to traditional stove designing methods. It represents a completely new approach in this field. While there are examples in the prior art of flat pack stoves that contain foldable elements, such stoves require extra assembly steps of having to position these elements carefully, having to clip elements together and often still having to assemble the stove using additional components. There are no known flat pack cooking stoves that compete with the speed and ease of setting up the portable cooking stove of the present invention, which requires only unfolding.

The portable cooking stove of the present invention may consist of a single unit construction. This means that, unlike flat-packing stoves of the prior art, there are no assembly steps required. That is, additional steps of clipping or otherwise connecting stove components together are not required.

As the portable cooking stove of the invention can be very economically manufactured, it is ideally suited to provide a disposable one-use or limited-use stove to the market. The stove is therefore highly complementary to the one-use barbeque systems that have already proven highly popular.

In one embodiment, the portable cooking stove has at least one wall which has no air inlet or exhaust ports. Air inlet and exhaust ports allow a line of sight to the burning fuel. In a military context, it may be important to prevent a line of sight between the burning fuel and the enemy. In this embodiment of the stove, the wall or walls lacking air inlet and exhaust ports can be pointed in the direction of the enemy and the portable cooking stove therefore used with a lessened risk of detection by the enemy.

In one embodiment of the invention, the cooking chamber can be unfolded separately from the combustion chamber. This means that the portable cooking stove can also be conveniently used as a storage vessel.

In another embodiment of the invention, the portable cooking stove can be designed such that it is deployed and collapsed in a single motion. This simplicity allows for very convenient and rapid use.

According to a second aspect, the present invention provides a heating vessel with a base that is shaped to intimately fit the integrated cooking chamber. Preferably the heating vessel is collapsible, and has a base with a square-based pyramidal shape.

According to a third aspect, the present invention provides a kit comprising the portable cooking stove according to the first aspect of the invention and at least one of: one or more solid-fuel blocks, and a heating vessel with a base that is shaped to intimately fit the integrated cooking chamber of the portable cooking stove.

In a preferred embodiment of the third aspect of the present invention, the solid-fuel block comprises hexamine, trioxane, or solidified methyl decanoate, preferably the solid-fuel block comprises methyl decanoate.

According to a fourth aspect, the present invention provides a method of manufacturing the portable cooking stove according to the first aspect of the invention, wherein: the stove is stamped to size and shape from a flat sheet of material; the stamped flat sheet is then die-pressed to form crease lines; the crease-lined sheet is then die-pressed into the deployed form of the cooking stove; and the stove is flat pressed into the flat form of the cooking stove. According to a fifth aspect, the present invention provides a method of heating a foodstuff by placing it directly in the integrated cooking chamber of the portable cooking stove according to the first aspect of the invention, or by placing it in a heating vessel that has been intimately fitted into the integrated cooking chamber of the portable cooking stove according to the first aspect of the invention, wherein a solid-fuel block is placed in the portable cooking stove underneath the integrated cooking chamber and set alight.

DESCRIPTION

Figure 1:
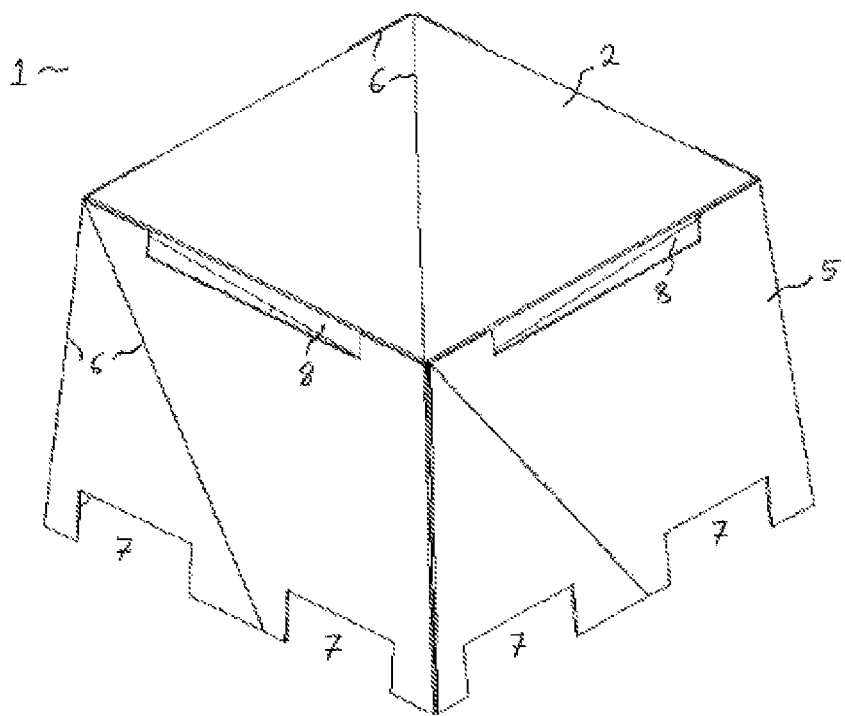
FIGS. 1 to 4 relate to different views of the deployed form of a cooking stove according to a preferred embodiment of the present invention.

The present invention relates to a portable cooking stove. By portable we mean that the stove can be easily carried by one person.

By cooking stove we mean a structure that defines a combustion chamber inside which fuel can be burnt, and that supports a cooking vessel over the burning fuel.

The portable cooking stove should preferably protect the burning fuel from being extinguished by effects of the environment such as wind or precipitation. In a preferred embodiment of the present invention this is accomplished by having solid walls. The portable cooking stove should also allow suitable airflow into and out of the combustion chamber to support combustion of the fuel. This can be accomplished by having air inlet ports and exhaust ports either in the walls of the stove or otherwise incorporated into the stove.

By integrated cooking chamber we mean that a cooking chamber is provided that forms part of a single unit stove construction. That is, the cooking chamber is connected to the portable cooking stove through either being the same folded piece of material as the portable cooking stove or connected to the walls of the portable cooking stove. The cooking chamber is a receptacle for holding water or food. As such it should be suitable for this purpose, and is usually large enough to cook a meal or drink for one person. The cooking chamber should also therefore be watertight. The cooking chamber is usually 0.25 to 1 liter in volume, preferably about 0.5 liters in volume.

The portable cooking stove can be unfolded to provide a deployed arrangement. By deployed arrangement, we mean an arrangement where the stove is in a three-dimensional structure that can be used in cooking, i.e. walls that define a combustion chamber for burning fuel and an integrated cooking chamber. The deployed arrangement may be created by the unfolding of a previously folded portable cooking stove or by the manufacturing process.

The portable cooking stove can be folded to provide a flat arrangement. By this we mean that the deployed arrangement can be folded such that the majority of the material of the portable cooking stove ends up substantially stacked together in a flat arrangement and that the combustion chamber void and cooking chamber void are substantially eliminated.

The fact that the stove of the present invention can be folded rather than disassembled to form a flat arrangement is a major advantage compared to prior art stoves, which are usually made up of multiple components that fit together. In contrast, the portable cooking stove of the present invention consists of a single unit construction, since the entire stove can be folded up. By this, we mean that the entire stove, including the integrated cooking chamber, is a single unit. There are no separate parts that must be assembled together when transitioning the stove from the flat arrangement to the deployed arrangement. Where the stove has been manufactured from multiple components, these components are all connected together to form a single unit that is not intended for disassembly by the user.

In a preferred embodiment of the present invention, the unfolding of the portable cooking stove from the folded flat arrangement to the unfolded, deployed arrangement requires a single step. This step can be, for example, that the user grips two opposite corners of the flat, folded arrangement and pulls the portable cooking stove into the unfolded, deployed arrangement. This is of great benefit to the user, particularly in situations such as where the user is tired, short on time or even injured. In a military context it may be important to deploy the stove very quickly. The stove of the present invention is very well suited to military applications.

In an alternative preferred embodiment of the invention, the integrated cooking chamber can be unfolded independently from the rest of the portable cooking stove. By this, we mean that if the user simply wants a storage vessels, the integrated cooking chamber can be unfolded but the combustion chamber can be kept in the flat folded form.

In a preferred embodiment of the present invention, the portable cooking stove consists of a single sheet of material. By this, we mean that the stove has been fabricated by taking a single sheet of material, whether aluminium or otherwise, and through simply cutting and folding, the portable cooking stove is formed in the unfolded, deployed arrangement, and is then subsequently simply folded down into the flat arrangement. This means that the portable cooking stove is surprisingly easy to manufacture, requiring only to be stamped out of the desired material and pressed into shape. The pressing also creates fold lines that then act as hinge lines to guide the folding and unfolding of the portable cooking stove. This allows the cost of manufacturing the portable cooking stove to be kept to a minimum.

In a preferred embodiment of the present invention, the folding can occur at prefabricated hinge lines of the portable cooking stove. When folding the portable cooking stove, or indeed any object, folding occurs more readily along lines that are weaker than the surrounding material, such lines being known as hinge lines. These hinge lines serve as a guide for the correct folding of the stove. These hinge lines can be made by a number of means, such as providing fold lines using a die press or scoring lines on the surface using a cutting tool. By prefabricated, we mean that the hinge lines are formed during the manufacturing process and can be, but are not necessarily, formed separately from folding the stove into the flat, folded arrangement.

In one embodiment of the present invention, the thickness of the material of the portable cooking stove is between 20 and 300 µm, preferably between 50 and 150 µm, and more preferably between 80 and 120 µm. By this, we are referring to a thickness, preferably of metal, that is amenable to creation of a hinge line through folding or scoring. This allows the stove to be very light in weight and also further acts to keep manufacturing costs low. This type of stove can be single-use. It is used to heat water or food and then disposed of.

In a different embodiment of the present invention, the portable cooking stove can be designed for multiple uses. In this embodiment the portable cooking stove can have thickness of material between 0.2 and 3 mm, preferably between 0.5 and 1.8 mm, and more preferably between 0.8 and 1.8 mm. Where it is intended for multiple uses, the stove may consist of multiple stove components coupled together to form a single unit and wherein folding occurs at couplings that provide a hinge motion. By this, we are referring to a more robust stove, where hinge lines made simply by pressing the material of the portable cooking stove are not suitable as they would break after repeated use cycles. A more robust stove would therefore be constructed using multiple components, such as panels, that are coupled together with more robust means of providing a hinge motion. The portable cooking stove may have hinges as the couplings. This could include, for example, any of a butt hinge, butterfly hinge, flush hinge, barrel hinge, continuous hinge, piano hinge, pivot hinge, flag hinge, T-hinge, strap hinge, living hinge made of a material different to that of the portable cooking stove, or other type of hinge. The invention may make use of different hinge types within a single portable cooking stove. Preferably the integrated cooking chamber is a single piece of material, connected to other components that are hinged to the chamber. The integrated cooking chamber is therefore watertight. The integrated cooking chamber may be made from a material that is resistant to fatigue from folding and heating cycles. Alternatively, the integrated cooking chamber may be made so that only the hinge region is made from a material that is resistant to fatigue from folding and heating cycles. Such an integrated heating chamber would, for example, be formed by fusing together two appropriate metals, with one type of metal for the main body and one other type of metal for the hinge. In a preferred embodiment of the present invention, the portable cooking stove has a deployed arrangement that is substantially a cuboid or square-based, rectangle-based, rhombus-based or parallelogram-based pyramidal frustum shape. By this, we mean that in the unfolded, deployed arrangement, the walls of the portable cooking stove define a cuboid or rectangle-based or square-based pyramidal frustum shape.

In order to function optimally, the portable cooking stove preferably has one or more air inlets and one or more exhaust outlets. For combustion to occur, the combustion chamber must have a means of allowing air into the combustion chamber such that it can feed the burning fuel. This can be provided by having one or more inlet ports toward the bottom of the stove. The air inlet ports may be provided toward the bottom of the stove walls or, alternatively, the air inlets may be from underneath the stove, for example, provided by placing the stove on a suspended grill or grid or by having the stove overhanging a ledge. The stove must also have a means of allowing exhaust fumes out of the combustion chamber. This can be provided by having one or more exhaust ports toward the top of the stove. The exhaust ports may be provided toward the top of the stove walls or, alternatively, in the connection between the integrated cooking chamber and the main stove body.

In one embodiment, all walls of the portable cooking stove have air inlet and exhaust ports. By this, we mean that the portable cooking stove has a number of substantially flat walls, typically four, where each wall has at least one air inlet port and at least one exhaust port. In another embodiment, at least one wall of the portable cooking stove has no air inlet or exhaust ports. By this we mean that the wall is substantially free of any perforations or gaps through which light from the burning fuel could be transmitted. In this embodiment, the portable cooking stove should block a line of sight to the burning fuel when viewed from one side. By this we mean that a four-sided stove should have two consecutive walls that have no air inlet or exhaust ports, and the apex between these walls is pointed in the direction in which the escape of light should be prevented. To ensure that the combustion efficiency of the fuel is unaffected in this embodiment of the portable cooking stove, the size of the remaining air inlet and exhaust ports should be increased accordingly. By this we mean that the surface area of the air inlet and exhaust ports as a proportion of the surface area of the wall should be increased on these walls. The integrated cooking chamber preferably has an inverted square-based, rectangle-based, rhombus-based or parallelogram-based pyramidal shape in the unfolded, deployed arrangement. Alternatively, in another preferred embodiment, the integrated cooking chamber is cuboidal. The integrated cooking chamber is a void that can hold a liquid or food material with a base and walls that are watertight.

The cooking chamber is watertight. By this, we mean that in use, water cannot leak out of the cooking chamber. The cooking chamber may have walls that comprise overlapping sheets of the folded material of the stove. Preferably, the fold pattern is such that the material of the stove forms a complete physical blockade around the cooking chamber, eliminating the possibility of channels between folds that connect the interior of the cooking chamber to the outside.

The portable cooking stove can be made from any suitable material. The material must, of course, be heat-resistant. The stove is preferably made from aluminium, titanium, nickel, copper, iron, or alloys thereof, or a heat-resistant non-metallic polymeric material.

The material of the stove may be embossed with patterning that improves the strength of the stove walls. Such a pattern may include a honeycomb structure of tessellated hexagons. The pattern may or may not be tessellated, and may include shapes such as circles, triangles, squares or other polygons.

A second aspect of the present invention relates to a heating vessel with a base that is shaped to intimately fit the integrated cooking chamber. By this, we mean a heating vessel with a base that is, for example, a cuboid or a square-based, rectangle-based, rhombus-based or parallelogram-based pyramidal shape with the same dimensions as the integrated cooking chamber. This is to facilitate for example, the optional ability in one operation to heat water or cook food for two or more individuals. When inserted into the integrated cooking chamber, the base of the heating vessel forms an intimate fit such that the walls of the base of the heating vessel are in thermal contact with the walls of the integrated cooking chamber. The integrated cooking chamber also forms a stand in which to rest the heating vessel with a base that is shaped to intimately fit the integrated cooking chamber.

In one embodiment of the second aspect of the present invention the heating vessel is collapsible, and has a base with a square-based pyramidal shape.

A third aspect of the present invention is a kit comprising the portable cooking stove and at least one of: one or more solid-fuel blocks, and a heating vessel with a base that is shaped to intimately fit the integrated cooking chamber of the portable cooking stove. The solid-fuel block could be made from hexamine, trioxane, or solidified methyl decanoate. Preferably the solid-fuel block comprises methyl decanoate.

A fourth aspect of the present invention relates to a method of manufacturing the portable cooking stove of the first aspect of the invention, wherein: the stove is stamped to size and shape from a flat sheet of material; the stamped flat sheet is then die-pressed to form crease lines; the crease-lined sheet is then die-pressed into the deployed form of the cooking stove; and, optionally, the stove is flat pressed into the flat form of the cooking stove.

A fifth aspect of the present invention relates to a method of heating a foodstuff by placing the foodstuff directly in the integrated cooking chamber of the portable cooking stove of the first aspect of the invention, or by placing the foodstuff in a heating vessel that has been intimately fitted into the integrated cooking chamber of the portable cooking stove of the first aspect of the invention, wherein a solid-fuel block is placed in the portable cooking stove underneath the integrated cooking chamber and set alight. By foodstuff we mean either a drink or food that is to be heated before consumption.

Once the drink or food has been heated by the portable cooking stove of the first aspect of the invention, the operator pours the contents of the integrated cooking chamber into a suitable drinking cup or other vessel for consumption. Alternatively, if the heating vessel according to the second aspect of the invention is used, the user can simply consume the contents directly from the heating vessel. In this second case, the user can use the portable cooking stove of the first aspect of the invention as a stand to store the heating vessel when not being held by the user. To protect the user from the heat of the walls of the cooking chamber, the cooking chamber may be provided with heat-resistant pads, or tabs that extend out from the cooking chamber. These will allow the user to lift the cooking stove while it is hot, for example, to pour into another vessel or to consume the contents directly from the stove.

DETAILED DESCRIPTION OF THE DRAWINGS

FIG. 1 shows a preferred embodiment of the cooking stove of the present invention 1 in the deployed form. In this embodiment, the cooking stove is made from a single sheet of material 5 and comprises an integrated cooking chamber 2 and air inlets 7 and exhaust ports 8. Fold lines 6 in the material of the stove serve as a guide when folding the stove to the flat form.

Figure 2:
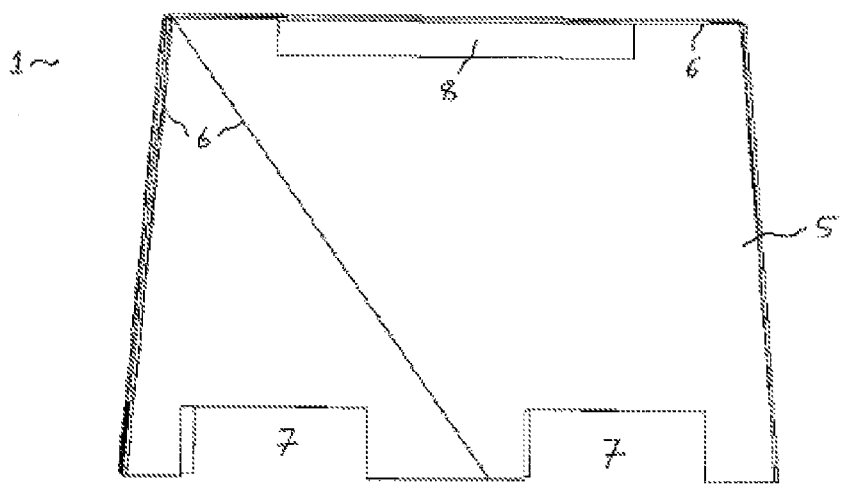
Figure 3:
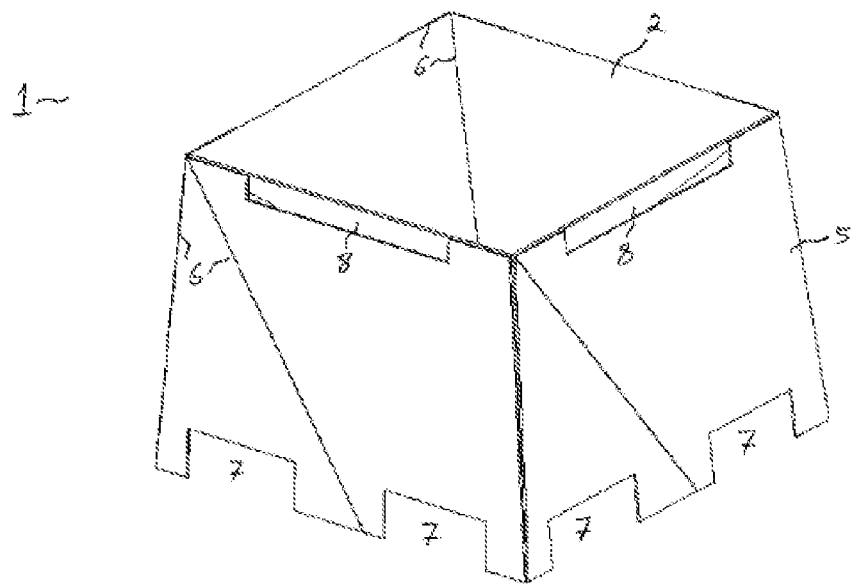
Figure 4:
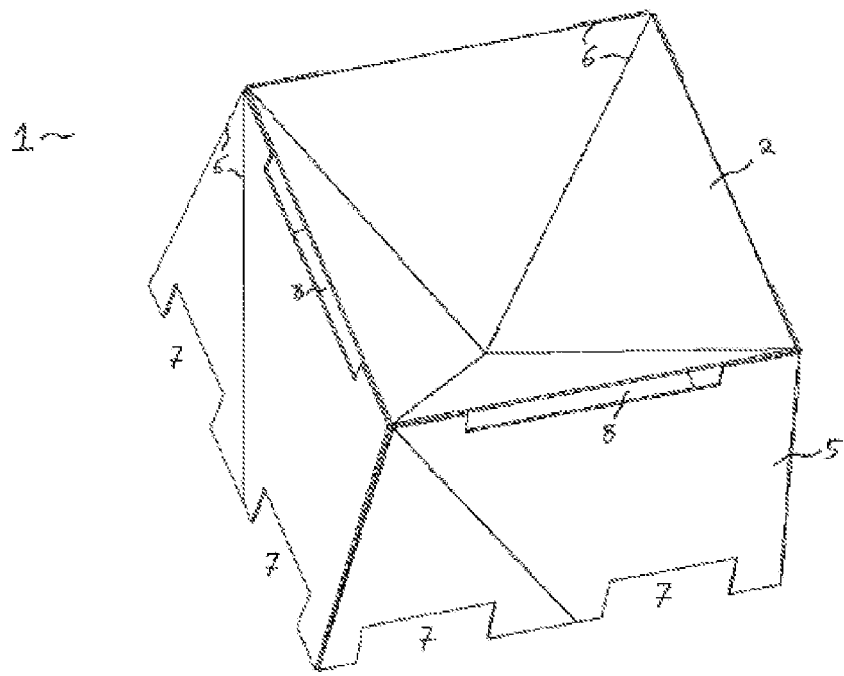

FIGS. 2 to 4 show the cooking stove 1 of FIG. 1, but from different view points. The integrated cooking chamber as shown in FIG. 4 is integrally recessed. The integrated cooking chamber is watertight and is used for heating food or drink.

Figure 5:
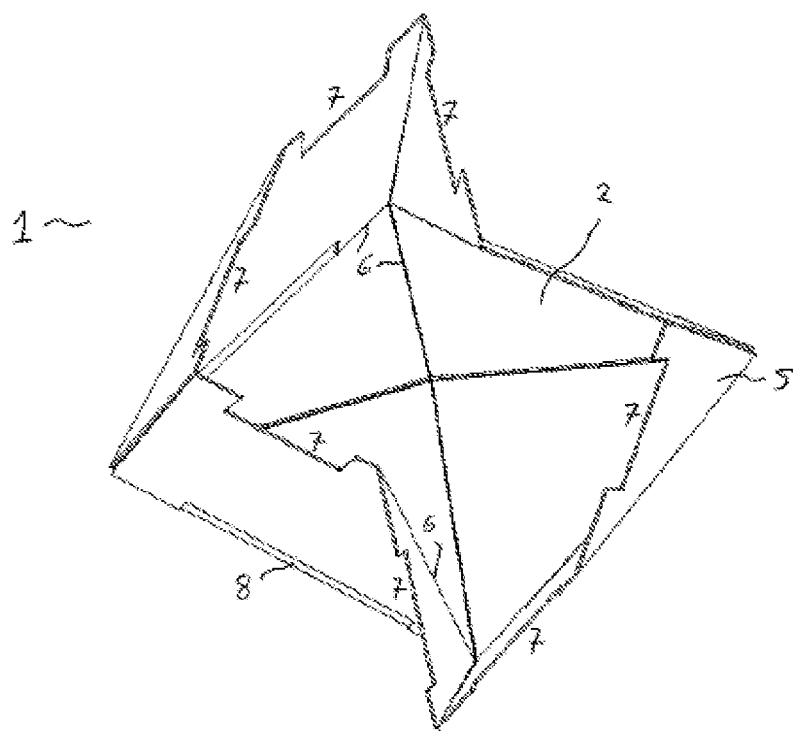
FIGS. 5 to 9 relate to different views of different stages of the folding of the cooking stove of FIGS. 1 to 4 between the flat form and the deployed form.

FIG. 5 shows the cooking stove 1 of FIG. 1 in a partially folded form. The view is from below the cooking stove 1 and shows how a number of the fold lines 6 operate to allow the cooking stove 1 to be folded to a flat form.

Figure 6:
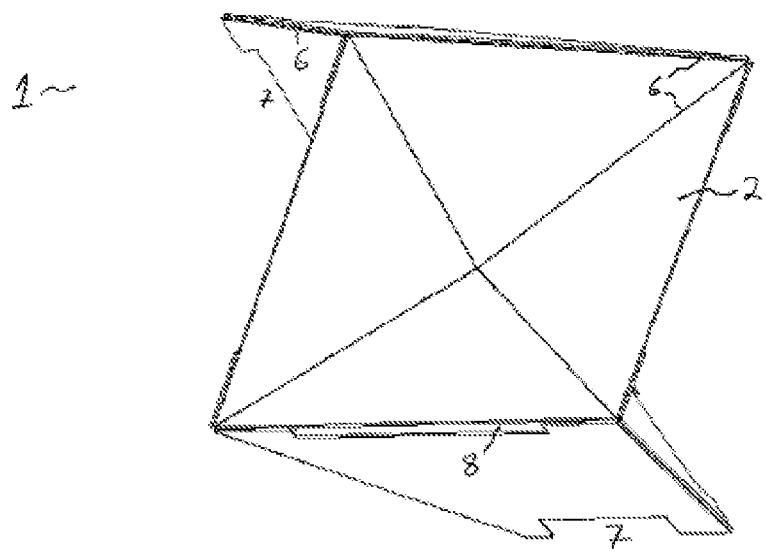

FIG. 6 shows the cooking stove 1 of FIG. 5 from a viewpoint of looking down on the cooking stove 1.

Figure 7:
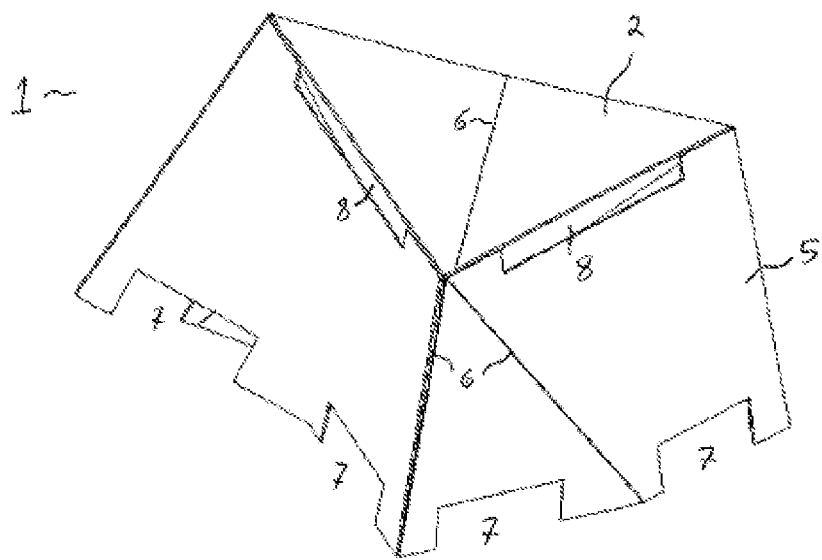

FIG. 7 shows the cooking stove 1 of FIGS. 5 and 6 from a viewpoint of side on.

Figure 8:
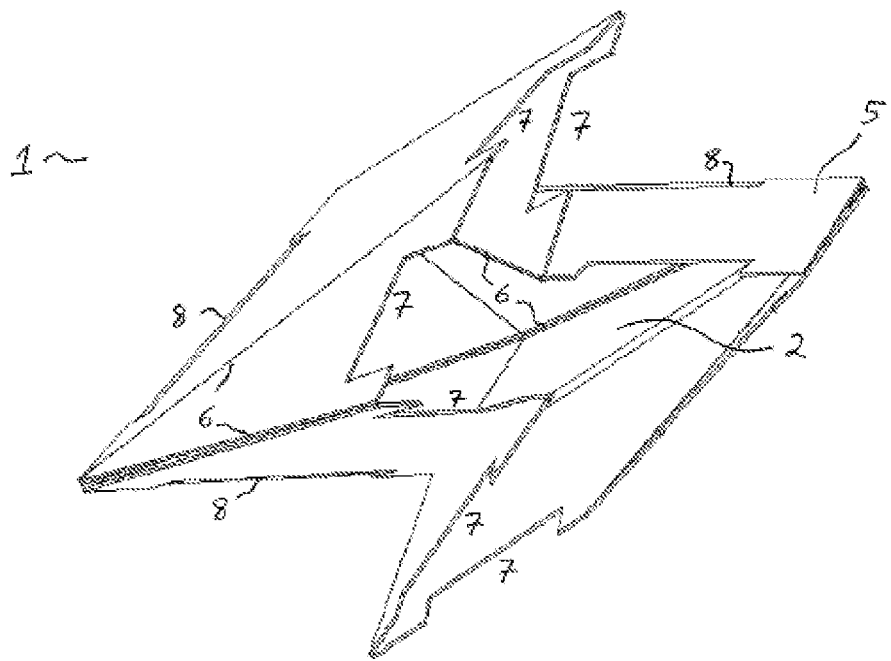
Figure 9:
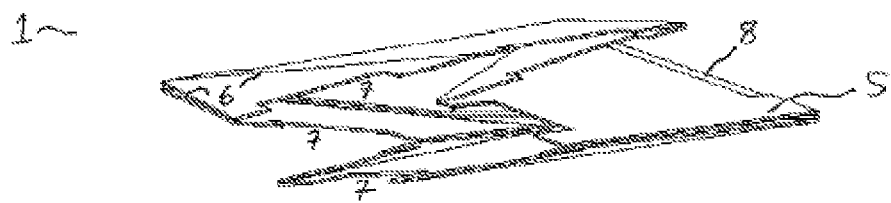
Figure 10:
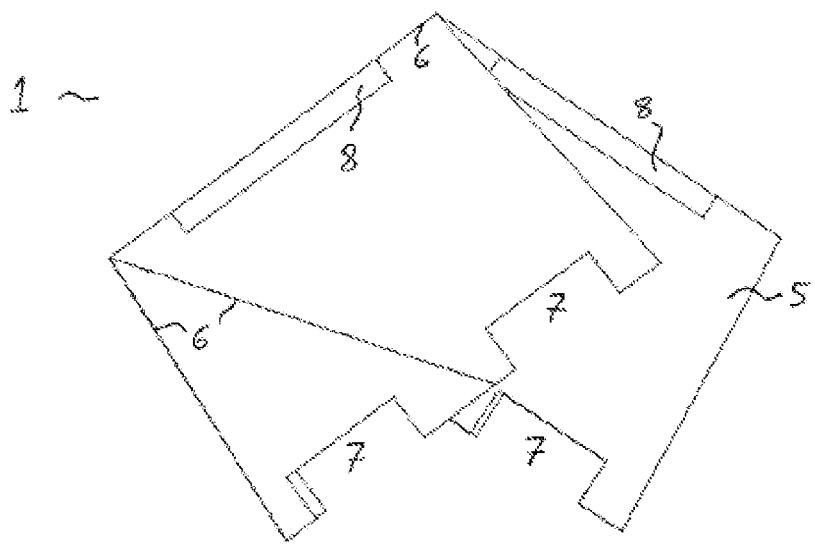
FIG. 10 relates to the folded form of the portable cooking stove of FIGS. 1 to 4.

FIGS. 8 and 9 show the cooking stove 1 of FIG. 5 in successively more folded forms, and FIG. 10 shows the cooking stove 1 in the final flat form.

Figure 11:
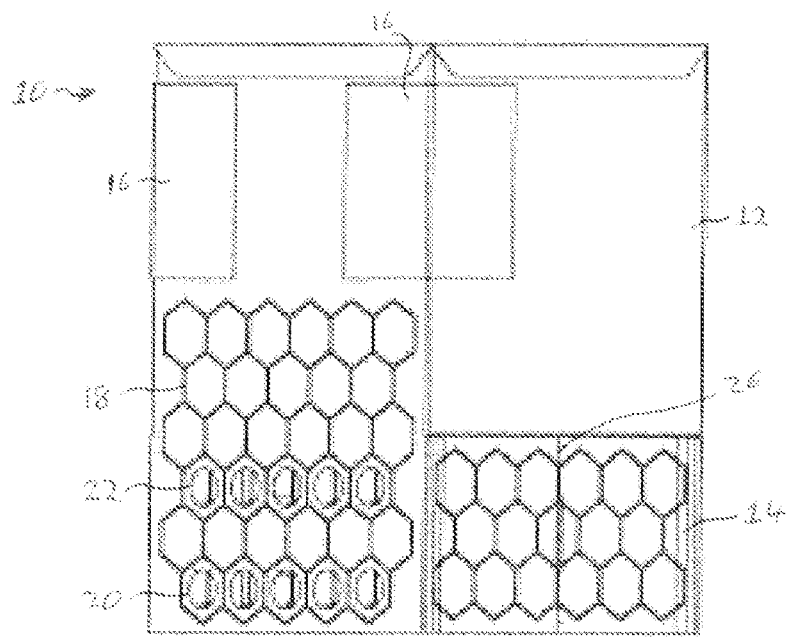
FIGS. 11 to 13 relate to different views of the deployed form of a cooking stove according to a second preferred embodiment of the present invention.
Figure 12:
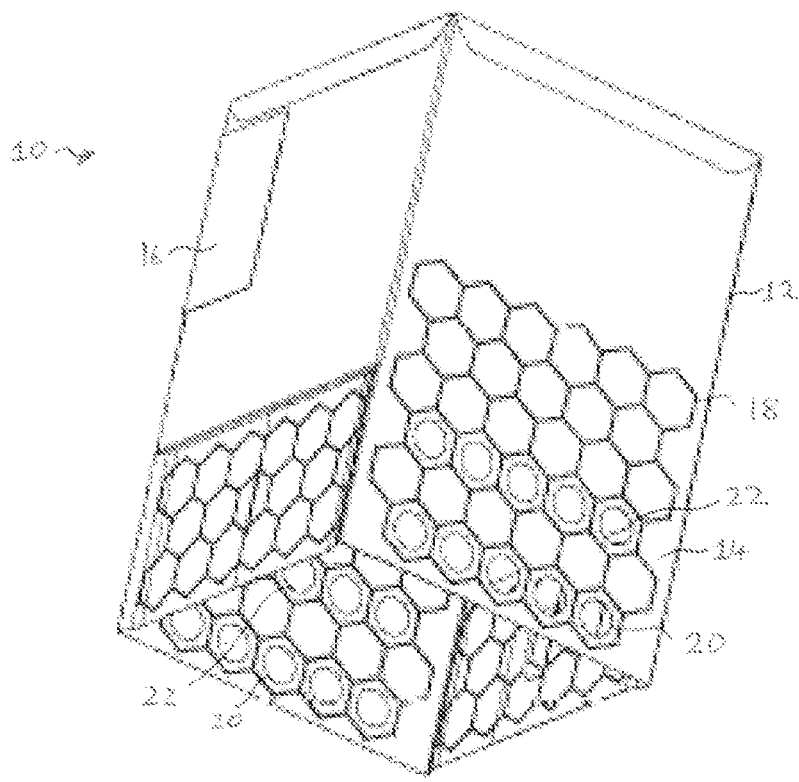
Figure 13:
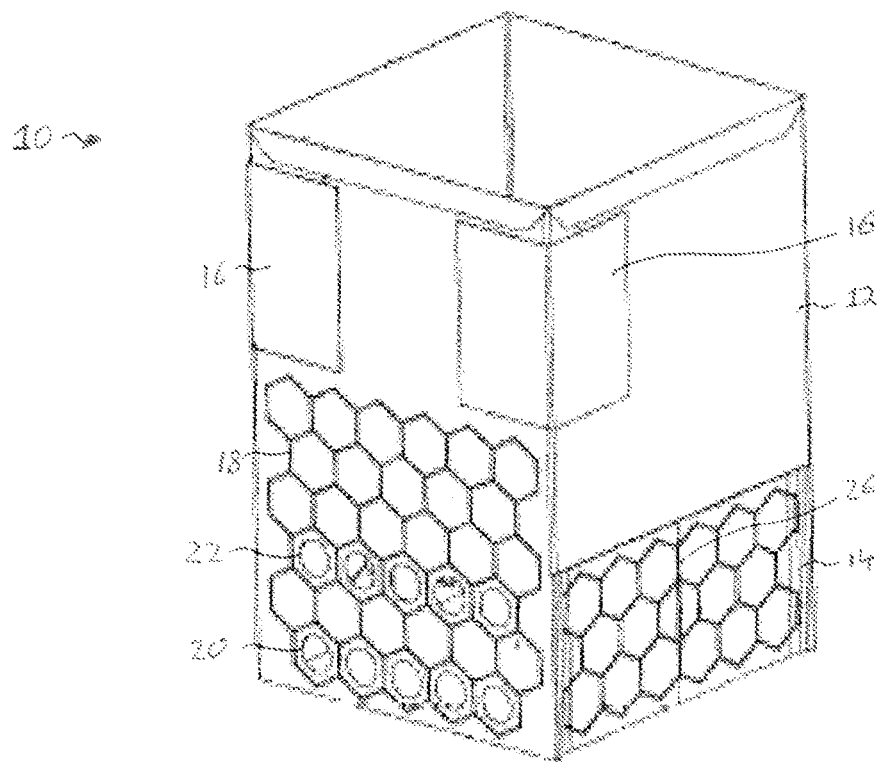

FIGS. 11 to 13 show different views of a cooking stove 10 according to a second preferred embodiment of the invention. The cooking stove 10 is cuboid, with a cuboid cooking chamber 12 and combustion chamber 14. The cooking stove 10 additionally has two heat-resistant pads 16 that allow the user to pick up the cooking stove 10 while hot. The cooking stove 10 has a honeycomb structure of tessellated hexagons 18 that provide additional structural stability. The combustion chamber 14 has air inlet ports 20 and air outlet ports 22. In this embodiment, the combustion chamber 14 is constructed by interlocking two flaps of the material of the cooking stove 10 together at the interlock 26.

Figure 14:
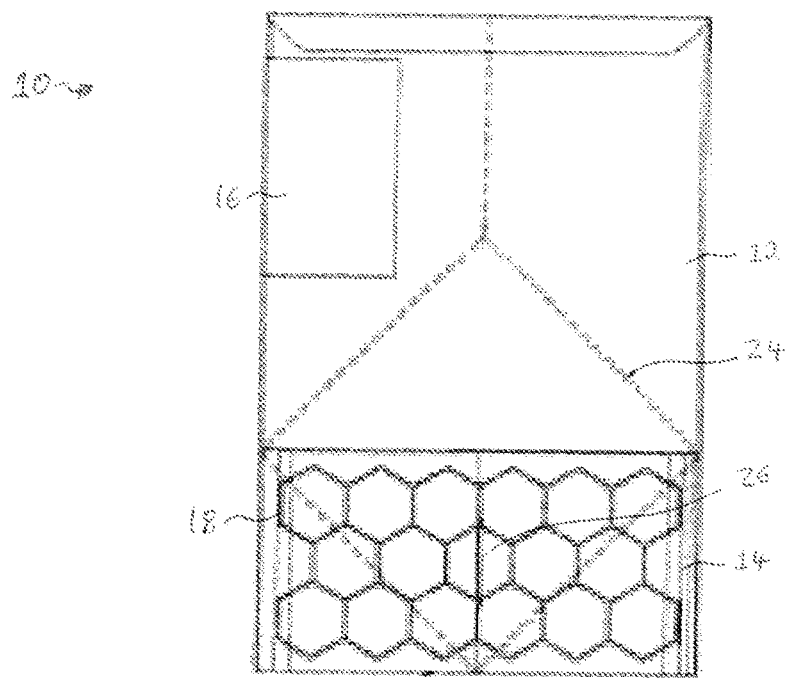
FIGS. 14 to 17 show the four side views of the cooking stove of FIGS. 11 to 13, additionally showing the fold lines that allow the stove to transition between the deployed configuration and the flat-pack configuration.
Figure 15:
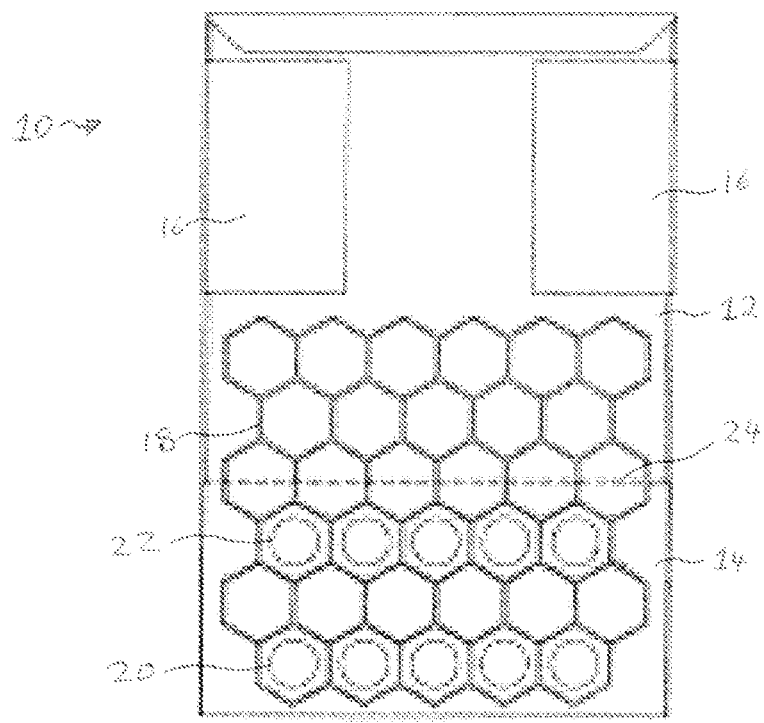
Figure 16:
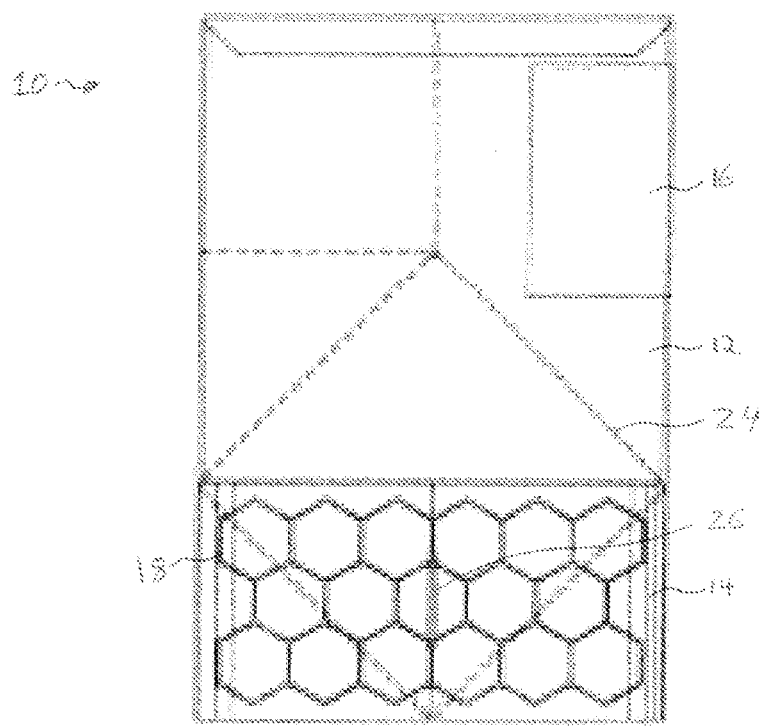
Figure 17:
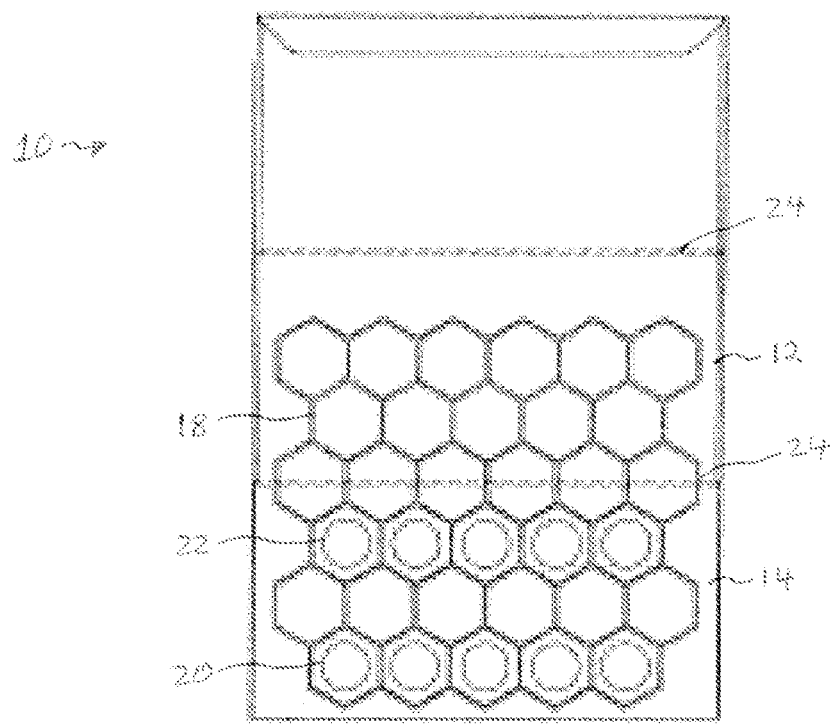

FIGS. 14 to 17 show the cooking stove 10 of FIGS. 11 to 13, but additionally show the fold lines 24 that allow the cooking stove 10 to transition between the deployed configuration and the flat-pack configuration. Specifically, FIG. 14 shows the right face, FIG. 15 shows the front face, FIG. 16 shows the left face, and FIG. 17 shows the rear face.

EXAMPLES

In one iterance the stove with integral heating chamber/container is manufactured from a single sheet of material which can be aluminium, copper, an alloy or hybrid metal or a suitable hybridised polymer or laminate. In this example, an aluminium sheet which is 100 μm thick is used. The sheet is first introduced to a die press which is configured to stamp out the required holes, shapes and provide scores of various depths to allow for further processing.

The punched sheet is then placed into a primary forming press which contains a tool to produce the initial shaping. This process is to establish the fold lines and cause the material to be stretched and compressed in the required positions. A second tool is used to produce the finished shape which is rhomboid, this is the opened and operating form of the product.

The final process takes the product and by applying a force diagonally through the "Z" axis and causes the product to collapse along the previously defined fold lines into a flat shape.

This is the primary defined process for manufacture. However, this is not the only process for manufacture, others have yet to be established and will vary according to the style and longevity of the end product; for example where a separate heating chamber is required.

What is claimed is:

1. A portable cooking stove that comprises a plurality of panels defining a stove component configured to combust fuel and a watertight cooking chamber integrally formed with the stove component, wherein the portable cooking stove can be folded to provide a flat arrangement and unfolded to provide a deployed arrangement,
wherein the integrated cooking chamber can be unfolded independently from a combustion chamber of the portable cooking stove.

2. The portable cooking stove of claim 1, wherein the integrated cooking chamber has a volume of 0.25 to 1 liter.

3. The portable cooking stove of claim 2, wherein the integrated cooking chamber has a volume of about 0.5 liters.

4. The portable cooking stove of claim 1, wherein a number of fold lines operate to allow the portable cooking stove to be folded to the flat arrangement and wherein unfolding the stove from the flat arrangement to the deployed arrangement requires a single step.

5. The portable cooking stove of claim 1, wherein the panels consist of a single sheet of material.

6. The portable cooking stove of claim 1, wherein the folding can occur at hinge lines.

7. The portable cooking stove of claim 1, wherein the panels include a material having a thickness between 20 and 300 μm.

8. The portable cooking stove of claim 5, wherein the panels include a material having a thickness between 80 and 120 μm.

9. The portable cooking stove of claim 1, wherein the portable cooking stove includes multiple stove components coupled together to form a single unit and wherein folding occurs at couplings between the stove components that provide a hinge motion.

10. The portable cooking stove of claim 9, wherein the couplings are hinges.

11. The portable cooking stove of claim 1, wherein the panels include a material having a thickness between 0.2 and 3 mm.

12. The portable cooking stove of claim 1, wherein the panels include a material having a thickness between 0.8 and 1.2 mm.

13. The portable cooking stove of claim 1, wherein when the portable cooking stove is in the deployed arrangement it defines substantially a cuboid or square-based pyramidal frustum shape.

14. The portable cooking stove of claim 1, wherein the portable cooking stove has one or more air inlets and one or more exhaust outlets.

15. The portable cooking stove of claim 1, wherein the portable cooking stove includes four walls that define a combustion chamber, wherein two walls have no air inlet or exhaust ports.

16. The portable cooking stove of claim 1, wherein the integrated cooking chamber defines a cuboid or an inverted square-based pyramidal shape when the portable cooking stove is in the deployed arrangement.

17. The portable cooking stove of claim 1, wherein the portable cooking stove is made from aluminium, titanium, nickel, copper, iron, or alloys thereof, or a heat-resistant non-metallic polymeric material.

* * * * *